(12) United States Patent
Lille

(10) Patent No.: US 7,119,988 B2
(45) Date of Patent: Oct. 10, 2006

(54) PERPENDICULAR MAGNETIC HEAD HAVING MODIFIED SHAPING LAYER FOR DIRECT PLATING OF MAGNETIC POLE PIECE

(75) Inventor: Jeffrey S. Lille, Sunnyvale, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 432 days.

(21) Appl. No.: 10/405,251

(22) Filed: Apr. 1, 2003

(65) Prior Publication Data

US 2004/0196589 A1 Oct. 7, 2004

(51) Int. Cl.
*G11B 5/127* (2006.01)
(52) U.S. Cl. ....................................... 360/125
(58) Field of Classification Search ............... None
See application file for complete search history.

(56) References Cited

U.S. PATENT DOCUMENTS

| | | | |
|---|---|---|---|
| 5,516,418 A | 5/1996 | Doss et al. | 205/119 |
| 5,576,099 A | 11/1996 | Canaperi et al. | 428/332 |
| 6,306,311 B1 | 10/2001 | Han et al. | 216/22 |
| 6,340,558 B1 | 1/2002 | Kubota et al. | 430/320 |
| 6,346,183 B1 | 2/2002 | Baer et al. | 205/119 |
| 6,757,141 B1 * | 6/2004 | Santini et al. | 360/317 |
| 6,952,867 B1 * | 10/2005 | Sato | 29/603.15 |

OTHER PUBLICATIONS

"VLSI Technology", S.M. Sze; 1983; pp. 272 & 273; Resists.

* cited by examiner

*Primary Examiner*—David Davis
(74) *Attorney, Agent, or Firm*—Robert O. Guillot; Intellectual Property Law Offices

(57) ABSTRACT

A magnetic head of the present invention includes a first magnetic pole that is exposed at the air bearing surface of the magnetic head and a second magnetic pole shaping layer that is not exposed at the air bearing surface. A layer of non-magnetic material is fabricated between the air bearing surface and the shaping layer, where the non-magnetic material is also electrically conductive. The pole tip of the magnetic head is electroplated on top of the non-magnetic electrically conductive material subsequent to the fabrication of the shaping layer, and in magnetic flux communication with the shaping layer.

16 Claims, 5 Drawing Sheets

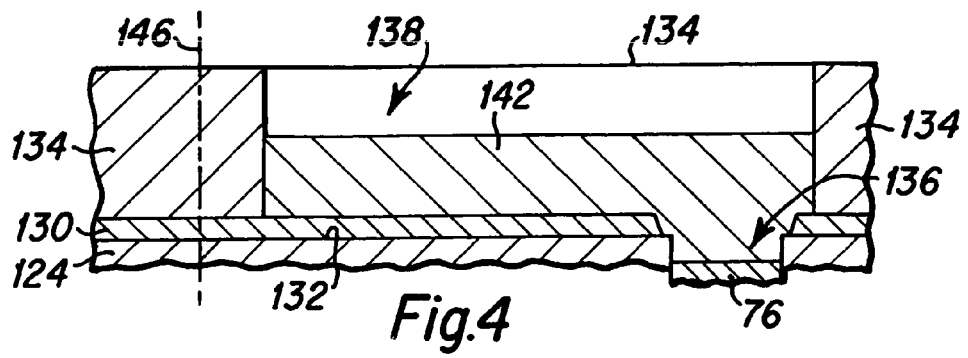
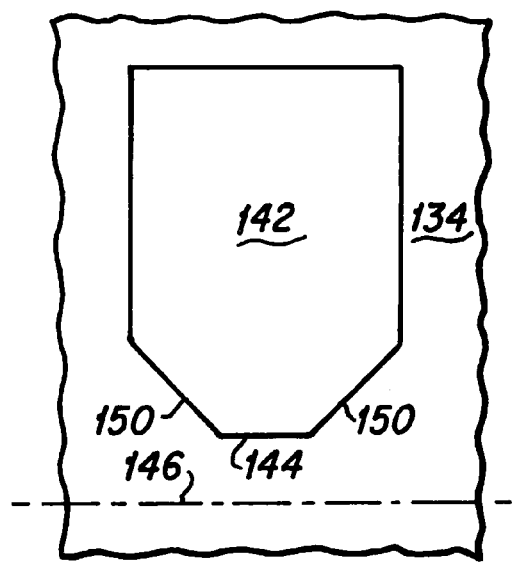
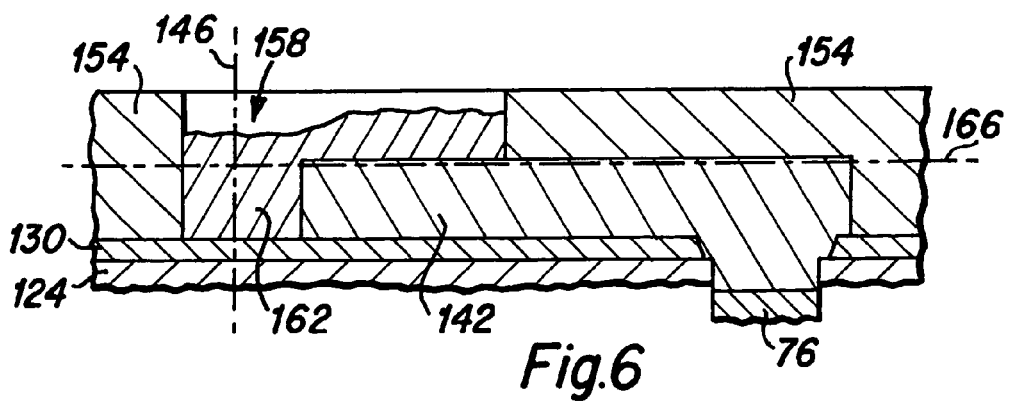

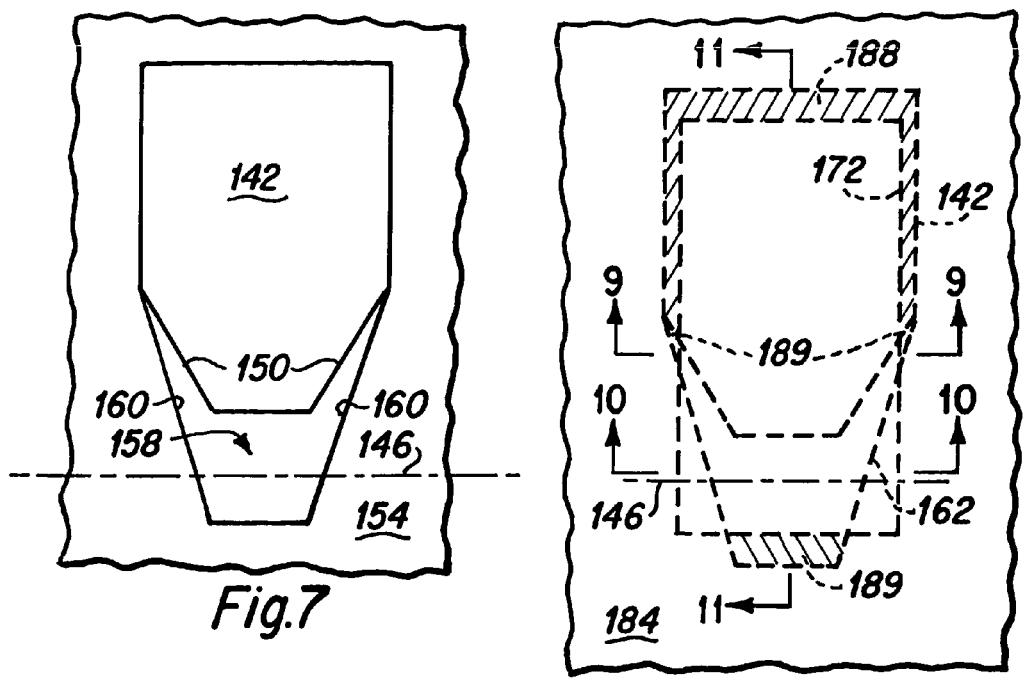

PERPENDICULAR MAGNETIC HEAD HAVING MODIFIED SHAPING LAYER FOR DIRECT PLATING OF MAGNETIC POLE PIECE

BACKGROUND OF THE INVENTION

1. Field of the Invention

The present invention relates generally to magnetic heads for hard disk drives, and particularly to perpendicular magnetic heads having electroplated pole tips.

2. Description of the Prior Art

Hard disk drives generally include one or more rotatable data storage disks having a magnetic data storage layer formed thereon. Data in the form of small magnetized areas, termed magnetic data bits, is written onto the magnetic layers of the disks by a magnetic head that includes magnetic poles through which magnetic flux is caused to flow. Magnetic flux flowing from a pole tip portion of the magnetic poles in close proximity to the magnetic layer on the disk, causes the formation of the magnetic bits within the magnetic layer.

Generally, magnetic bits can be created where the magnetic field direction of each bit is either in the plane of the magnetic layer or perpendicular to the plane of the magnetic layer. Magnetic heads that form magnetic bits having in plane magnetic fields are termed longitudinal magnetic heads, whereas magnetic heads that form bits having a magnetic field that is perpendicular to the plane of the magnetic layer are termed perpendicular heads. The present invention relates particularly to perpendicular magnetic heads.

In order to increase the areal data storage density of the disks, it is desirable to write smaller magnetic bits. To accomplish this, it is necessary to fabricate magnetic heads having a smaller magnetic pole tip, because the dimensions of the pole tip directly determine the size of the magnetic data bit that is written by the pole tip. In currently fabricated magnetic heads, the pole tips are fabricated with submicron dimensions to produce submicron sized magnetic bits. Such submicron sized magnetic pole tips are quite fragile, and are easily malformed, and/or damaged during the magnetic head fabrication process. Particularly, some fabrication processes utilize a sputter deposition technique for fabricating the pole tips; however, this technique can lead to the creation of unwanted voids within the pole tip material. Where the pole tips are electroplated, the occurrence of voids is substantially reduced. Additionally, where the pole tip is fabricated earlier in the magnetic head fabrication process, rather than later, an increased occurrence of damage to the pole tips during subsequent fabrication steps occurs. The present invention seeks to resolve these problems by electroplating the pole tip in fabrication steps towards the end of the magnetic head fabrication process.

SUMMARY OF THE INVENTION

A magnetic head of the present invention includes a first magnetic pole that is exposed at the air bearing surface of the magnetic head and a second magnetic pole shaping layer that is not exposed at the air bearing surface. A layer of non-magnetic material is fabricated between the air bearing surface and the shaping layer, where the non-magnetic material is also electrically conductive. The pole tip of the magnetic head is electroplated on top of the non-magnetic, electrically conductive material subsequent to the fabrication of the shaping layer, and in magnetic flux communication with the shaping layer.

It is an advantage of the magnetic head of the present invention that the magnetic pole tip is fabricated subsequent to the fabrication of a shaping layer of the magnetic pole to which it is joined in magnetic flux communication.

It is a further advantage of the magnetic head of the present invention that the magnetic pole tip is electroplated within the magnetic head without having an electroplating seed layer deposited beneath the pole tip.

It is yet another advantage of the magnetic head of the present invention that no electroplating seed layer of the pole tip is present at the ABS surface of the head.

It is yet a further advantage of the magnetic head of the present invention that a layer of non-magnetic material is disposed between the ABS surface and the relatively large shaping layer of the second magnetic pole of the magnetic head.

It is an advantage of the hard disk drive of the present invention that it includes a magnetic head of the present invention wherein the magnetic pole tip is fabricated subsequent to the fabrication of a shaping layer of a magnetic pole to which it is joined in magnetic flux communication.

It is a further advantage of the hard disk drive of the present invention that it includes a magnetic head of the present invention wherein the magnetic pole tip is electroplated within the magnetic head without having an electroplating seed layer deposited beneath the pole tip.

It is yet another advantage of the hard disk drive of the present invention that it includes a magnetic head of the present invention wherein no electroplating seed layer of the pole tip is present at the ABS surface of the head.

It is yet a further advantage of the hard disk drive of the present invention that it includes a magnetic head of the present invention wherein a layer of non-magnetic material is disposed between the ABS surface and the relatively large shaping layer of the second magnetic pole of the magnetic head.

It is an advantage of the fabrication process of the magnetic head of the present invention that the pole tip is fabricated subsequent to the fabrication of a shaping layer of a second magnetic pole, such that the likelihood of damage to the pole tip is reduced.

It is another advantage of the method for fabricating a magnetic head of the present invention that the pole tip is fabricated by an electroplating process directly upon a layer of non-magnetic, electrically conductive material.

It is a further advantage of the method for fabricating a magnetic head of the present invention that the pole tip is fabricated in an electroplating process without the use of an electroplating seed layer beneath the pole tip.

These and other features and advantages of the present invention will no doubt become apparent to those skilled in the art upon reading the following detailed description which makes reference to the several figures of the drawing.

IN THE DRAWINGS

FIGS. 3–16 are diagrams depicting the fabrication process for the perpendicular magnetic head of the present invention;

DETAILED DESCRIPTION OF THE PREFERRED EMBODIMENTS

Figure 1:
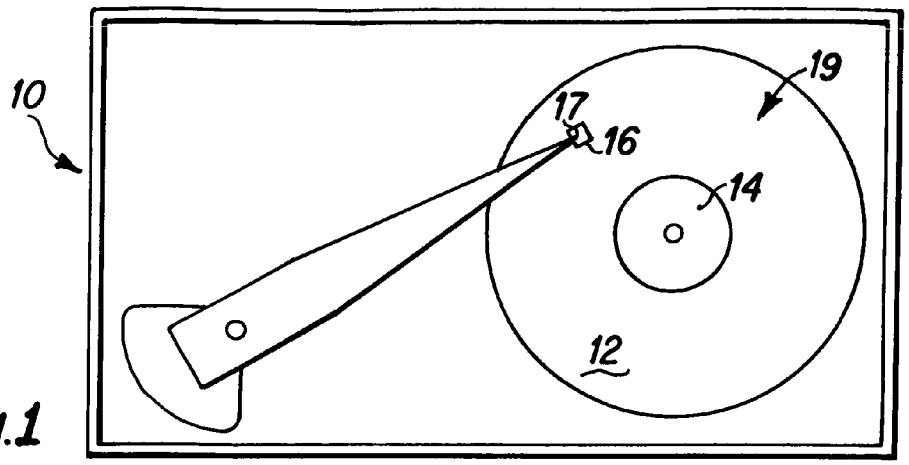
FIG. 1 is a schematic diagram depicting a hard disk drive including a magnetic head of the present invention.

The magnetic heads of the present invention are utilized to read and write data to magnetic media, such as hard disks in a hard disk drive. A simplified top plan view of a hard disk drive 10 is presented in FIG. 1, wherein at least one magnetic media hard disk 12 is rotatably mounted upon a spindle 14. A magnetic head 16 of the present invention is formed upon a slider 17 that is mounted upon an actuator arm 18 to fly above the surface 19 of each rotating hard disk 12, as is well known to those skilled in the art.

Figure 2:
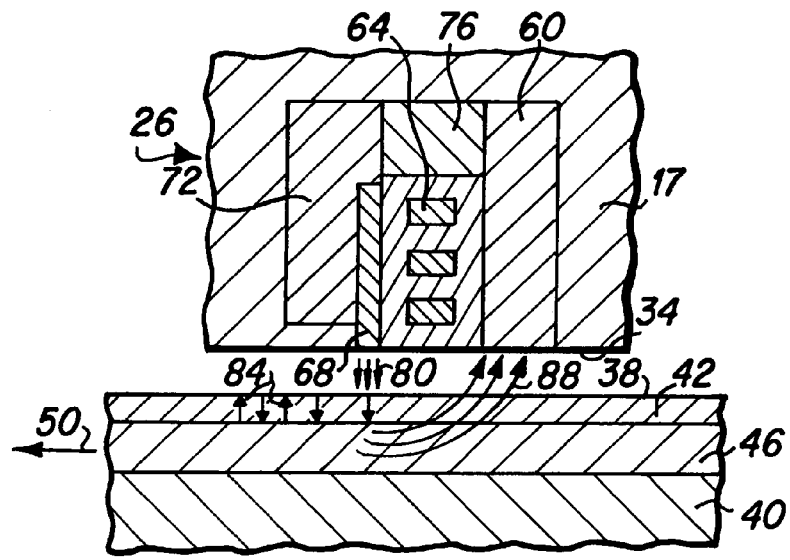
FIG. 2 is a diagram depicting a prior art perpendicular magnetic head.

FIG. 2 is a side cross-sectional diagram of a typical prior art perpendicular write head portion 26 of a magnetic head which serves as a basis for the description of the improved perpendicular write head of the present invention which follows. As depicted in FIG. 2, a slider 17 having an air bearing surface 34 is shown in a data writing position above the surface 38 of a hard disk 40. The disk 40 includes a high coercivity magnetic layer 42 that is fabricated on top of a magnetically soft underlayer 46. In FIG. 2, the disk 40 is moving towards the left (arrow 50) relative to the stationary slider 17.

The perpendicular head 26 includes a first magnetic pole (P1) 60 upon which has been fabricated an induction coil 64. A small, narrow pole tip 68 is fabricated on top of the induction coil structure 64 and a second magnetic pole (P2) 72 is fabricated on top of and in magnetic flux flow communication with the pole tip 68. A magnetic back gap piece 76 joins the upper portions of the P1 pole 60 and P2 pole 72, such that magnetic flux can flow between them. As is well understood by those skilled in the art, electrical current flowing through the induction coil 64 will cause magnetic flux to flow through the magnetic poles of the head, where the direction of magnetic flux flow depends upon the direction of the electrical current through the induction coil. For instance, current in one direction will cause magnetic flux to flow from the P2 pole 72 downwardly (see arrow 80) through the narrow P2 pole tip 68 into the high coercivity magnetic layer 42 of the hard disk 40. This magnetic flux 80 causes magnetized data bits to be recorded in the high coercivity layer 42 where the magnetic field of the data bits is perpendicular (see arrows 84) to the surface 38 of the disk 40. The magnetic flux then passes through the high coercivity layer 42 and flows into the magnetically soft underlayer 46 and disburses towards the P1 pole 60. The magnetic flux then flows upwardly (see arrows 88) into the P1 pole 60 and then through the back gap piece 76 to the P2 pole 72, thus completing a magnetic flux circuit. In such perpendicular write heads, it is significant that the P1 pole 60 is much larger than the pole tip 68 such that the density of the magnetic flux passing upwardly (see arrows 88) through the high coercivity magnetic layer 42 is greatly reduced and will not magnetically affect, or flip, the magnetic field of data bits on the hard disk, such as bits on data tracks adjacent to the track being written upon. Also, a feature of the perpendicular write head is that the distance between the P1 pole 60 and the P2 pole tip 68 is not as critical a dimension as it is in longitudinal write heads, where a P1 pole is separated from a P2 pole tip by a very thin write gap layer, and data bits are formed with a magnetic field direction that is in the plane of the high coercivity layer.

The desire to increase the areal data storage density of hard disks results in a desire to write data with ever smaller data bits, and therefore a need to fabricate write heads with ever smaller pole tips. When creating such very small pole tips, it is desirable to limit the number of fabrication steps that are conducted subsequent to the fabrication of the small pole tip, because each fabrication step brings with it the further chance that the pole tip will be damaged in some manner during these subsequent fabrication steps, thus degrading individual device performance and also reducing manufacturing yield. As will be understood from the following description of the present invention, an advantage of the preferred embodiment of the present invention is that the pole tip is fabricated subsequent to the fabrication of the larger portions of the P2 magnetic pole layer, whereby fewer write head fabrication steps are undertaken following the fabrication of the pole tip. However, as described herein, the pole tip can be fabricated earlier in the process, where appropriate steps are taken to protect it during subsequent fabrication steps. These and further features of the present invention will become apparent from the description of the method for fabricating the present invention that follows.

Figure 3:
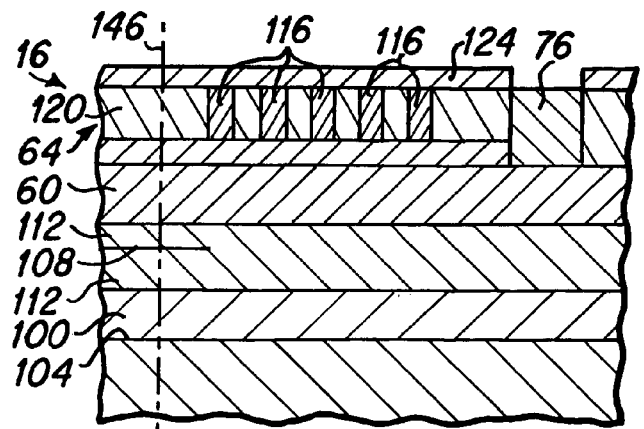

FIG. 3 is a side cross-sectional view of a step in the fabrication of the perpendicular magnetic head 16 of the present invention. The features shown in FIG. 3 are a part of prior art perpendicular heads and serve as a basis for understanding the fabrication process of the present invention. As depicted in FIG. 3, a first magnetic shield (S1) 100 is fabricated upon a substrate surface 104. A read head element 108 is then fabricated within electrically insulative layers 112, and a second magnetic shield (S2) 60, which may also function as a first magnetic pole (P1) 60 in a type of magnetic head termed a merged head, is fabricated on top of the read head insulation layers 112. Thereafter, an induction coil structure 64, shown as five induction coil turns 116 that are fabricated within an electrical insulation layer 120, is fabricated on top of the P1 pole 60, using standard fabrication techniques, such as photolithographic and electroplating processing techniques. Thereafter, a back gap piece 76, composed of a magnetically conductive material such as permalloy, is fabricated in magnetic connection with the P1 pole 60. Thereafter, the upper surface of the induction coil and back gap piece are planarized, such as through a chemical mechanical polishing (CMP) step, and a patterned electrical insulation layer 124 is deposited on top of the induction coil 64.

A more common head design (not shown) is called a piggyback head where the S2 magnetic shield and P1 pole layer are separate ferromagnetic layers that are magnetically separated from each other by a layer that would typically be a layer of insulation (e.g. alumina). This reduces the write head induced reader instabilities. Ideally the thickness of this separation layer between the ferromagnetic layers will be at least one micrometer.

In commencing to fabricate the magnetic head of the present invention, as is next seen in the cross sectional view of FIG. 4, a non-magnetic electroplating seed layer 130, for a layer of the second magnetic pole termed a shaping layer, is next deposited upon the planar upper surface 132 of the insulation layer 124. The seed layer 130 may be composed of a material such as NiP. A portion 136 of the seed 130 may be removed for future alignment and magnetic continuity of the magnetic back gap 76. Thereafter, using well known photolithographic techniques, a patterned resist layer 134 is fabricated in which a shaping layer trench 138 is created upon the seed layer 130. Thereafter, as depicted in FIG. 4, the shaping layer 142 is electroplated within the trench 138, and FIG. 5 is a top plan view depicting the position and shape of the shaping layer 142. A preferred shaping layer material is NiFe 45/55 although other compositions of NiFe as well as other known magnetic materials can be used. A significant feature of the position of the shaping layer 142, as depicted in FIGS. 4 and 5, is that it is fabricated with a front side 144 that is disposed away from the planned ABS surface (dotted line 146). A feature of the shape of the shaping layer 142 is that it is fabricated with sidewalls 150 that are parallel with the ABS surface 146 and tapered inwardly towards the ABS.

As is next seen in the cross-sectional view of FIG. 6, following the electroplating of the shaping layer 142, utilizing further photolithographic techniques, the resist 134 is removed and a second patterned resist 154 is fabricated, such that a trench 158 is formed in front of the shaping layer 142. It is significant that the trench 158 extends beyond the ABS surface (dotted line 146) of the head. This extension of the trench 158 will ease the requirements of an upcoming electroplating process step. FIG. 7 is a top plan view which shows the location and shape of the trench 158 formed in front of the shaping layer 142, and wherein it is seen that the trench extends across the ABS surface 146, and that it includes sidewalls 160 that are parallel with the ABS surface 146. Following the formation of the trench 158, a further electroplating step is conducted utilizing in part, the seed layer 130 for electrical connection. Significantly, in this electroplating step a non-magnetic, electrically conductive material is electroplated into the trench 158. The non-magnetic, electrically conductive material 162 may be a material such as nickel phosphorous NiP or nickel chromium NiCr, and it is plated up within the trench 158. A preferred characteristic of the non-magnetic material 162 is that it is non-corrosive and doesn't produce excessive recession or protrusion when the ABS is later polished.

Following the plating of the non-magnetic material 162, the photoresist material 154 is removed from the wafer surface utilizing photolithographic techniques. The seed layer 130 is next removed along with material in the field (outside the device region). The wafer is then covered with an insulator 164 such as alumina (shown in FIG. 9 and described herebelow), that is deposited across the surface of the wafer. Thereafter, the surface of the wafer is planarized in a CMP step down to a level 166 (see FIG. 6) that is at or within the upper surface of the shaping layer 142, such that all non-magnetic material 162 upon the surface of the shaping layer is removed. A probe layer part of the second magnetic pole that includes a pole tip will next be fabricated on top of both the shaping layer 142 and the non-magnetic material layer 162, as will next be described.

As depicted in the plan view of FIG. 8, a patterned resist (see dotted lines 172) is next fabricated upon the flat surface of the wafer to cover the central portions of the shaping layer 142 and the non-magnetic material 162, and an electroplating seed layer 184 is then deposited across the surface of the wafer. As depicted in FIG. 8, the seed layer 184 is fabricated to make electrical contact with the edges 188 (shaded in FIG. 8) of the shaping layer 142 and the edge 189 (shaded in FIG. 8) of the non-magnetic material 162, where the central portions of the shaping layer and non-magnetic material are masked from the seed layer 184 by the patterned resist 172. Thereafter, as can be seen in the cross-sectional views of FIGS. 9 and 10, which are taken along lines 9—9 and 10—10 of FIG. 8, and the side cross-sectional view of FIG. 11 that is taken along lines 11—11 of FIG. 8, the patterned resist 172 is removed utilizing photolithographic techniques, and a mask layer 200 for a probe layer portion of the second magnetic pole is deposited across the surface of the wafer. The mask layer 200 is deposited onto the shaping layer 142 and the non-magnetic material 162, and upon the seed layer 184. It is significant that the seed layer 184 is not deposited across the entire surface of the shaping layer 142 and the non-magnetic layer 162, but rather, it is only deposited in non-critical side areas 188 and 189 of the shaping layer 142 and the non-magnetic material 162. For reasons that will appear hereafter it is desirable that the mask layer 200 be comprised of a relatively hard material that can act as a CMP stop layer, or can be selectively removed utilizing a reactive ion etch (RIE) process. Suitable materials for the mask layer 200 are materials such as $SiO_2$ and $Ta_2O_5$. The mask layer 200 can also be a suitable resist.

Figure 12:
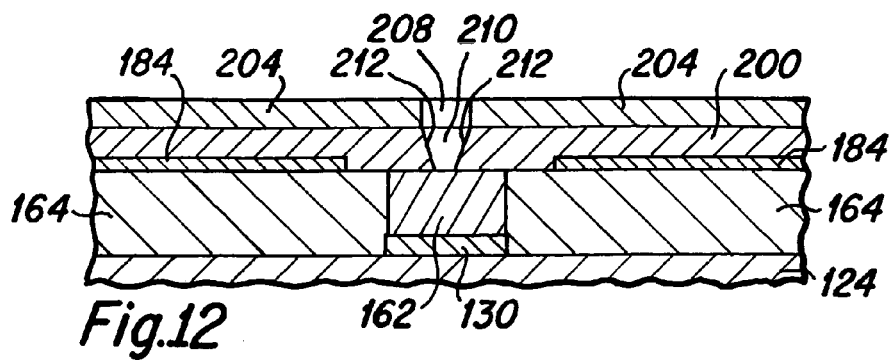
Figure 13:
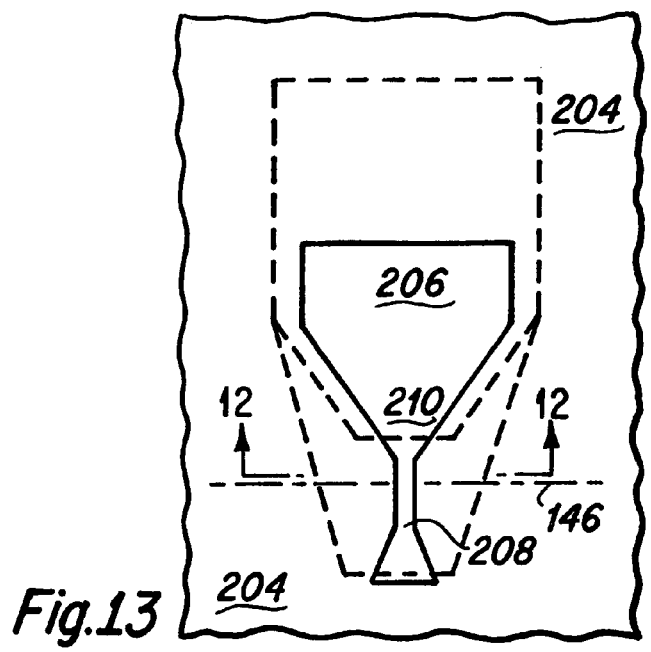

As is next seen in the front elevational view of FIG. 12 (taken along lines 12—12 of FIG. 13) and the top plan view of FIG. 13, a RIE mask layer 204 is deposited on top of the mask layer 200 and patterned to create a mask opening 206 in the shape of the probe layer plus the P2 pole tip opening 208. Thereafter, in an RIE etching process, such as utilizing fluorine species where the layer 204 is composed of $SiO_2$, a probe layer trench 210 is etched into and through the layer 200. The materials comprising the non-magnetic layer (NiP or NiCr) 162 and the shaping layer (NiFe) 142 are not susceptible to the reactive ion etch process, and therefore act as an RIE stop layer. As depicted in FIG. 12, it is preferable that the probe layer trench 210 be formed with beveled side edges 212 in the RIE etching process, such that the P2 pole tip will have a generally trapezoidal shape, as is depicted and described herebelow. An alternative fabrication method is to form the mask layer 200 directly from a resist material, where the trench 210 can be made by optimization of a lithography process. This would remove the need for the RIE mask layer 204.

Figure 14:
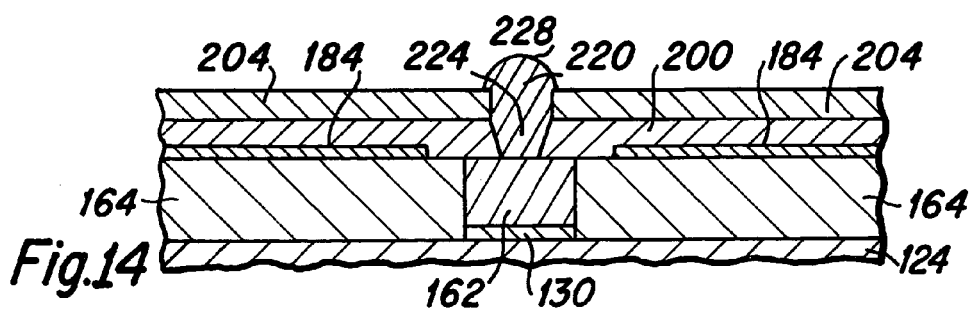
Figure 15:
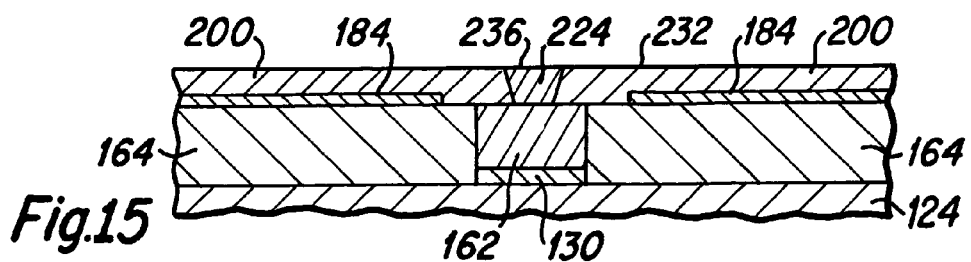

As is next seen in the front elevational view of FIG. 14, an electroplating step is then conducted in which the probe layer 220 including the P2 pole tip 224 is electroplated up within the probe layer trench 210. A preferred probe layer material is high magnetic moment CoFe, although NiFe and other known materials can be used. One should also note that other deposition techniques such as sputtering could be used to deposit the probe layer material. It is preferable to overplate until an overplating material mushroom 228 is formed. At this point it can be appreciated that the probe layer 220 and P2 pole tip 224 are electroplated directly onto the non-magnetic material 162 and the shaping layer 142, and that a reason that the non-magnetic material 162 is electrically conductive is that good electroplating of the P2 pole tip 224 upon it at the ABS surface 146 can be obtained without a seed layer removal at the pole tip location. Electroplating the probe layer and pole tip is preferable to other techniques such as sputtering deposition, as the formation of voids in the pole tip is reduced where electroplating is utilized. As is next seen in FIG. 15, a CMP step is next conducted in which the overplated probe layer material 228 and RIE mask 204 are removed down to the surface 232 of the mask layer 200. As indicated above, it is preferable that the mask layer 200 be formed of a hard material, such as $SiO_2$ or $Ta_2O_5$ to act as a CMP stop to preserve the height of the P2 pole tip 224 and to obtain a flat top surface 236 upon it. Thus the thickness of the mask layer 200 determines the thickness of the P2 pole tip 224.

Figure 16:
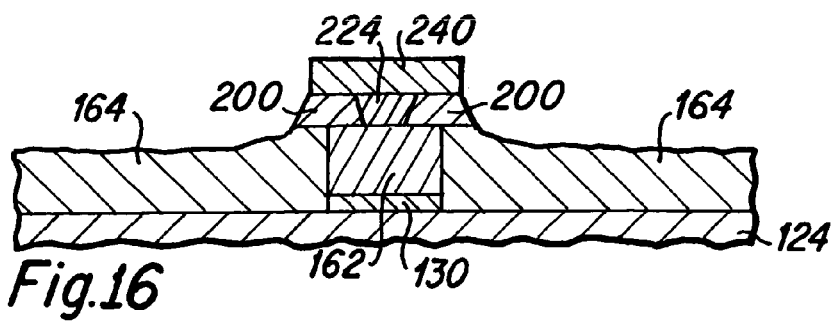
Figure 17:
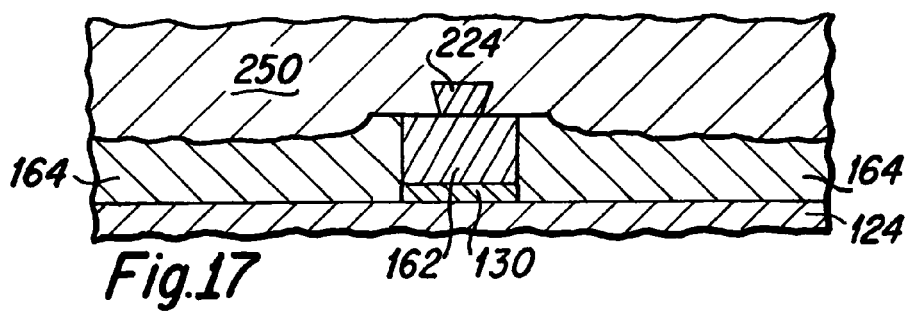
FIG. 17 is an elevational view of the perpendicular magnetic head of the present invention taken from the air bearing surface (ABS)
Figure 18:
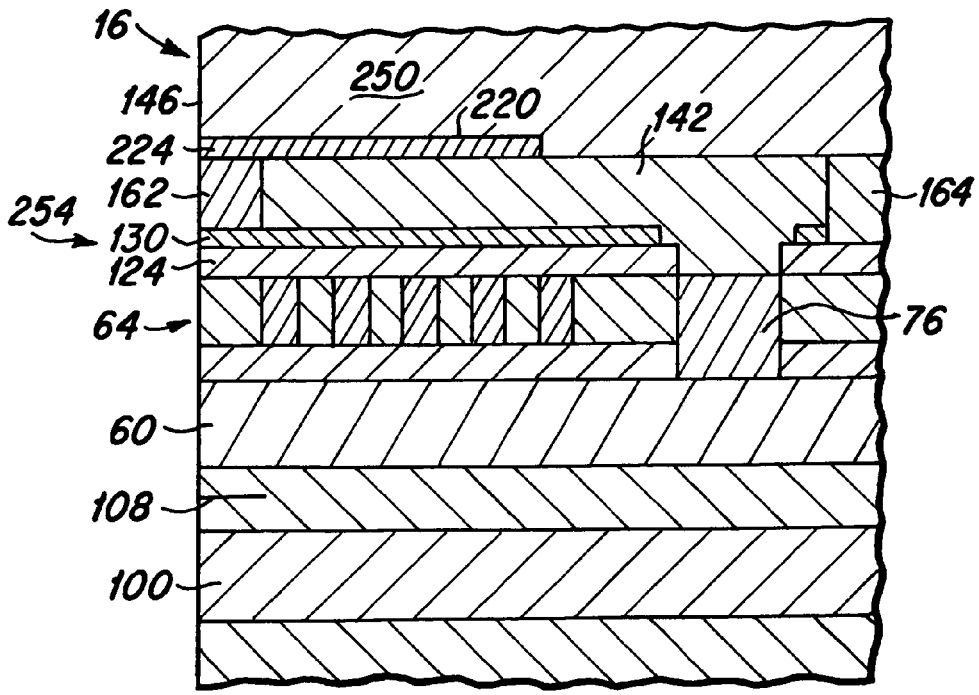
FIG. 18 is a side cross-sectional view of the completed perpendicular magnetic head of the present invention.

It is desirable to remove the remaining mask layer material and any probe layer and seed layer material in the field to complete the fabrication of the head. As depicted in FIG. 16, this may be accomplished by first covering the probe layer 220 and P2 pole tip 224 with a photoresist mask 240 and then conducting an etching step, such as an ion milling or etching step to remove the exposed mask layer material, exposed probe layer material and seed layer in the field. Thereafter, following further standard head fabrication steps, such as the fabrication of electrical leads, the remaining photoresist mask 240 is removed utilizing photolithographic techniques, followed by a further RIE step to remove the remaining mask layer material 200 that was covered by the photoresist 240. Other exposed components of the head, such as the P2 pole tip, are not susceptible to the RIE process and remain unaffected. Thereafter, as depicted in FIG. 17, the head is encapsulated, such as by the deposition of alumina 250 across the surface of the wafer, and FIG. 18 provides a cross-sectional view of the completed perpendicular head 16 of the present invention that has been cut and polished at the ABS surface 146. Note that the exact location, shape, and dimensions of the induction coil structure 64, read sensor 108, and return yoke (the P1 pole 60) may vary.

It should also be noted that fabrication process of the probe layer and P2 pole tip may also vary. That is, alternate process is to electroplate a larger structure and form the desired probe layer and P2 pole tip via ion milling by removing the unwanted magnetic material.

Therefore, some significant features of the present invention are as follows. With reference to the top view presented in FIG. 7, it can be understood that the sidewalls 150 of the shaping layer 142 are tapered towards the P2 pole tip 224 to facilitate the flow of magnetic flux upwards towards the bottom of the P2 pole tip. As will be appreciated from the front elevational view of FIG. 17, and the cross-sectional view of FIG. 18, the second magnetic pole structure 254 of the present invention includes a shaping layer 142 that is spaced away from the ABS 146 by the non-magnetic material 162 that was fabricated in front of it at the ABS; thus unwanted magnetic field flux leakage from the shaping layer across the ABS is reduced. The probe layer 220 is preferably electroplated directly upon the shaping layer 142 without the use and presence of an electroplating seed layer therebetween. Similarly, the P2 pole tip portion 224 of the probe layer 220 is electroplated directly upon the non-magnetic, electrically conductive material 162, without the use and presence of an electroplating seed layer therebetween; so at the ABS there is no seed layer between the P2 pole tip and the non-magnetic material. This provides improved definition to data bits written by the P2 pole tip.

As will be well understood by those skilled in the art after having read the preceding detailed description of the present invention, a magnetic head can be fabricated in which the novel features of the pole tip fabrication of the present invention are applied to the first magnetic pole 60, and the second magnetic pole is formed without a pole tip. That is, the first magnetic pole will be fabricated to include the shaping layer, the non-magnetic, electrically conductive layer and the probe layer having a pole tip that is electroplated upon both the shaping layer and the non-magnetic, electrically conductive layer. Thereafter, an adequately thick insulation layer is fabricated on top of the pole tip, followed by the fabrication of the induction coil structure and the subsequent fabrication of a second magnetic pole layer having an enlarged pole surface (similar in size to the P1 pole 60 depicted in FIGS. 2 and 3) exposed at the ABS. Such a magnetic head is therefore in the contemplation of the inventors, and is intended to be encompassed within the claims set forth herebelow.

While the present invention has been shown and described with reference to certain preferred embodiments, it is to be understood that those skilled in the art will no doubt devise alterations and modifications in form and detail which will nevertheless include the basic spirit and scope of the invention. It is therefore intended that the following claims cover all such alterations and modifications.

I claim:

1. A magnetic head comprising:
    a first magnetic pole having a portion thereof that is exposed at an air bearing surface (ABS) of the magnetic head;
    a shaping layer portion of a second magnetic pole, said shaping layer being engaged in magnetic flux communication with said first magnetic pole and having no portion thereof that is exposed at said ABS;
    a layer of non-magnetic, electrically conductive material being disposed between said shaping layer and said ABS.

2. A magnetic head as described in claim 1 further including a probe layer portion of said second magnetic pole, said probe layer including a pole tip, wherein said pole tip is disposed at least in part upon said non-magnetic material, and wherein portions of said probe layer are disposed in magnetic flux communication with said shaping layer.

3. A magnetic head as described in claim 1 wherein said non-magnetic, electrically conductive material is comprised of NiP or NiCr.

4. A magnetic head as described in claim 1 wherein said shaping layer is fabricated with sidewalls that are tapered inwardly in a direction towards said ABS.

5. A magnetic head as described in claim 1, where a seed layer for fabricating said shaping layer is non-magnetic.

6. A magnetic head as described in claim 5, where said seed layer for fabricating said shaping layer is exposed at said ABS.

7. A magnetic head as described in claim 1 wherein said probe layer is electroplated directly onto said shaping layer, and portions of said pole tip are electroplated directly onto said non-magnetic, electrically conductive material.

8. A magnetic head as described in claim 1 wherein said non-magnetic, electrically conductive material is formed with a thickness that is approximately equal to a thickness of said shaping layer.

9. A hard disk drive, comprising:
    at least one hard disk being adapted for rotary motion upon a disk drive;
    at least one slider device having a slider body portion;
    a magnetic head being formed on said slider body portion for writing data on said hard disk; said magnetic head including:
    a first magnetic pole having a portion thereof that is exposed at an air bearing surface (ABS) of the magnetic head;
    a shaping layer portion of a second magnetic pole, said shaping layer having no portion thereof that is exposed at said ABS;
    a layer of non-magnetic, electrically conductive material being disposed between said shaping layer and said ABS.

10. A hard disk drive as described in claim 9 further including a probe layer portion of said second magnetic pole, said probe layer including a pole tip, wherein said pole tip is disposed at least in part upon said non-magnetic material, and wherein portions of said probe layer are disposed in magnetic flux communication with said shaping layer.

11. A hard disk drive as described in claim 9 wherein said non-magnetic, electrically conductive material is comprised of NiP or NiCr.

12. A hard disk drive as described in claim 9 wherein said shaping layer is fabricated with sidewalls that are tapered inwardly in a direction towards said ABS.

13. A hard disk drive as described in claim 9, where a seed layer for fabricating said shaping layer is non-magnetic.

14. A hard disk drive as described in claim 13, where said seed layer for fabricating said shaping layer is exposed at said ABS.

15. A hard disk drive as described in claim 9 wherein said probe layer is electroplated directly onto said shaping layer, and portions of said pole tip are electroplated directly onto said non-magnetic, electrically conductive material.

16. A hard disk drive as described in claim 9 wherein said non-magnetic, electrically conductive material is formed with a thickness that is approximately equal to a thickness of said shaping layer.

* * * * *